United States Patent [19]

Snitzer

[11] Patent Number: 4,712,075
[45] Date of Patent: Dec. 8, 1987

[54] OPTICAL AMPLIFIER

[75] Inventor: Elias Snitzer, Wellesley, Mass.

[73] Assignee: Polaroid Corporation, Cambridge, Mass.

[21] Appl. No.: 802,369

[22] Filed: Nov. 27, 1985

[51] Int. Cl.$^4$ ................................................ H01S 3/00
[52] U.S. Cl. ........................................ 330/4.3; 372/39
[58] Field of Search ..................... 330/4.3; 372/39, 40, 372/75, 92, 6, 94, 23; 350/96.13

[56] References Cited

U.S. PATENT DOCUMENTS

| | | | |
|---|---|---|---|
| 3,270,290 | 8/1966 | Maurer | 372/40 |
| 3,284,722 | 11/1966 | Gray | 372/75 |
| 3,355,674 | 11/1967 | Hardy | 372/6 X |
| 3,408,131 | 10/1968 | Kapany | 350/96 |
| 3,599,106 | 8/1971 | Snitzer | 372/6 X |
| 3,611,188 | 10/1971 | Snitzer et al. | 372/40 |
| 3,711,787 | 1/1973 | Snitzer et al. | 372/40 |
| 3,753,145 | 8/1973 | Chesler | 372/75 |
| 3,825,500 | 7/1974 | Shaw et al. | 372/40 X |
| 4,044,315 | 8/1977 | Snitzer | 372/6 X |
| 4,136,929 | 1/1979 | Suzaki | 372/6 |
| 4,162,460 | 7/1979 | Gonda | 331/94.5 |
| 4,225,826 | 9/1980 | Lewis et al. | 330/4.3 |
| 4,364,014 | 12/1982 | Gray | 330/4.3 |
| 4,510,604 | 4/1985 | Taylor et al. | 372/92 X |
| 4,515,431 | 5/1985 | Shaw et al. | 372/6 X |
| 4,594,857 | 7/1985 | Uchida et al. | 65/3 |

FOREIGN PATENT DOCUMENTS 0136871 4/1985 European Pat. Off. ................ 372/6
2151869 7/1985 United Kingdom .................... 372/6

OTHER PUBLICATIONS

Charles Koester and Elias Snitzer; "Amplification in a Fiber Laser", 1964; Applied Optics; vol. 3, No. 10.
Shevelevich et al; Optical Dielectric Waveguide as Laser Amplifier; 1972; Opt. Spectrosc., vol. 38, No. 6.

Primary Examiner—Thomas H. Tarcza
Assistant Examiner—Mark Hellner
Attorney, Agent, or Firm—Francis J. Caufield

[57] ABSTRACT

An optical amplifier particularly suitable for use in amplifying signals carried on optical fiber in a select communication band. The amplifier comprises a resonant optical waveguide cavity which has a core containing an active gain material with given absorption and fluorescence spectrums. The gain material is of the type that preferably has at least two different emission bands originating from the same energy level with one of the emission bands encompassing the select communication band. The cavity is structured to resonate wavelengths in both emission bands, but with a higher combination of cavity Q and gain coefficient per excited ion for wavelengths in the emission band not corresponding to the select communication band so that, when pumped, the cavity first lases at this band. The lasing action causes the atomic population of the gain material corresponding to the communication band to remain at a stable constant level where it is available to uniformly amplify by stimulated emission optical signals introduced into the cavity.

18 Claims, 9 Drawing Figures

OPTICAL AMPLIFIER

BACKGROUND OF THE INVENTION

This invention in general relates to optical communications and in particular to amplifiers for use in increasing signal strength in optical fiber based communications systems.

In optical communications, information is encoded by modulating according to well-known schemes the optical power from a source to produce an optical signal. Afterward, the signal, or signals where some form of multiplexing is in use, is introduced into an optical fiber transmission line and, after travelling along the line for some distance, is decoded at the receiving end. As the signal travels along the transmission line, it suffers losses due to well-known attenuation effects associated with the optical fiber characteristics. The amount of signal attenuation allowable is related to the initial signal power, usually considered fixed for a given source, and the minimum power required at the receiver for accurate signal decoding. Consequently, the transmission distance is limited by the ratio of the input signal power to the required receiver power. For transmission over greater distances, the initial signal must be amplified without any significant loss of information through distortion or amplification with signal reconstruction is required, a process performed by a device ususally referred to as a repeater rather than an amplifier which raises signal strength without reconstruction. Thus, amplifiers are an important element in optical communication systems and this holds regardless of the particular modulation format utilized.

Early repeaters were electro-optical devices which converted optical signals to their electrical equivalents, increased their amplitude, and then reconverted them back to optical form for retransmission along the trunk. Although these are still in use and are perfectly suitable for particular applications, they do suffer from obvious disadvantages which include the need for separate power sources and some means of conveniently coupling to and from the transmission line. In addition, multiplexed signals require some means of separation by wavelength followed by a separate amplification stage for each signal separated after which some means of recombination for retransmission is necessary.

Purely optical amplifiers without the disadvantages of the electro-optical repeaters are known in the art as, for example, that shown and described in U.S. Pat. No. 3,894,857 issued to Teiji Uchida et al on July 15, 1975 for a "Process for Exchanging Alkali Ions for Thallium Ions in a Glass Fiber". Here, the amplifier is a length of optical glass fiber with a gradient index for waveguiding action and laser active substance for amplification purposes. The fiber can be coiled around a source or the source can be arranged along a length of the fiber to introduce pumping energy to the active region of the fiber to effect amplification of signals guided within its core. Other examples of optical amplifiers are given by Elias Snitzer in his paper entitled "Fiber Lasers and Dispersion in Fibers" from Proceedings of the First European Electro-optics Markets and Technology Conference, pp 374–378, Geneva (Sept. 1972) published by JPC Science and Technology Press.

Thus, optical amplifiers are known and are attractive for their simplicity. However, optical amplifiers are not without difficulty. Among these are the need for long amplification length and/or great pump power for sensible signal gain levels and precise control over atomic population levels is required for uniform levels of amplification.

Consequently, there is still a need for improved optical amplifiers, and it is a primary object of this invention to provide an optical amplifier of simple construction with reasonable gain.

It is another object of this invention to provide a multiple pass optical amplifier of relatively short length.

It is yet another object of this invention to provide an optical amplifier of uniform gain with ease of gain control.

It is yet another object of this invention to reduce the noise associated with spontaneous emission to only those wavelength intervals in which signal amplification occurs.

Other objects of the invention will in part be obvious and will in part appear hereinafter. The invention, accordingly, comprises the apparatus possessing the construction, combination of elements and arrangement of parts which are exemplified in the following detailed disclosure.

SUMMARY OF THE INVENTION

This invention in general relates to communication via modulated electromagnetic waves in the optical region of the spectrum and in particular to an optical amplification or gain device that is suitable for use in increasing the strength of optical signals that are within a select communication band and travel by way of optical fiber. In its broadest form, the device comprises a resonant optical waveguide cavity which has a core that contains an active gain material with given absorption and fluorescence spectrums. The gain material is one that is of the type having at least two different emission bands originating from the same emissive energy level with one of the emission bands encompassing the select communication band.

The cavity is structured to resonate wavelengths in both of the gain material emission bands but in a way such that the cavity losses and gain coefficient is more favorable for laser oscillation in the emission band not corresponding to the select communication band. Consequently, when pumping energy is fed into the cavity, it lases at the emission band not corresponding to the communication band and the atomic population in the excited state is fixed at the threshold value for laser oscillation of the non-communications band. This atomic population provides gain in the communication band at a value below its lasing threshold thereby making it available for amplification of signals which are introduced into the cavity and are within the select communication band. Any changes in pump power will change the light output at the laser oscillation band but not affect the population inversion, thereby creating the desired effect of making the net gain in the amplifier for the communications band independent of fluctuations in the pump power. In this way, the lasing action at one emission band provides precise control of the level of energy at the non-lasing emission band so that this energy is available for amplification of signals encompassed within that emission band.

The cavity can be in form either a linear Fabry-Perot with dichroic end mirrors or a closed-loop resonator with an intercavity element to control the gain/cavity loss combination for each emission band. In either case, the cavity is preferably made of single mode optical fiber having a core containing neodymium oxide as the active gain material.

Feedback in the form of a radiation sensitive device along with appropriate electronics is preferably employed to monitor the cavity output and regulate pumping power to assure continuous laser action and minimize transient fluctuations.

Input and output of signals to the cavity is preferably achieved by way of lateral coupling.

The preferred composition of the optical fiber core is fused silica as the host material to which the active gain material is added within the range of 0.01 to 10 weight percent.

BRIEF DESCRIPTION OF THE DRAWINGS

The novel features that are considered characteristic of the invention are set forth with particularity in the appended claims. The invention itself, however, both as to its organization and method of operation, together with other objects and advantages thereof, will be best understood from the following description of the illustrated embodiments when read in connection with the accompanying drawings wherein like numbers have been employed in the different figures to denote the same parts and wherein:

DETAILED DESCRIPTION

The optical amplifier of the invention is particularly suitable for use in optical fiber based communication systems where information bearing signals are carried as modulated electromagnetic waves in the optical region of the spectrum. In use, it is not restricted to particular modulation formats and is suitable for amplifying either multiplexed signals collectively or single signals separately. It is most suitable for use in amplifying single mode signals and is used most advantageously for this application. As will be seen, the invention can be practiced in a variety of ways for these purposes where each represents a difference in form but where all are based on a common concept. The common concept is that a resonant waveguide cavity which includes an active gain material having a number of emission peaks can be structured in such a way that it can be made to preferentially lase at a preselected peak with the lasing action there used as a means for providing a stable amplifying level of gain at another peak corresponding to a communication band of interest. How this is implemented in detail may best be understood with reference to the various embodiments of the invention.

Figure 1:
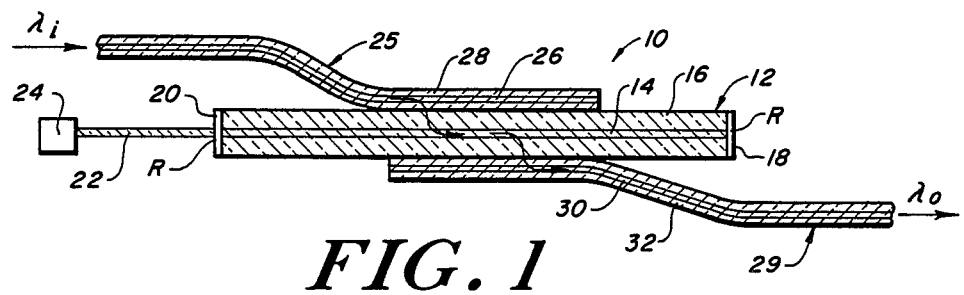
FIG. 1 is a diagrammatic representation of one form of the optical amplifier of the invention.

The first embodiment, illustrated in FIG. 1, is the optical amplifier designated generally as 10. Amplifier 10 comprises a resonant optical waveguide cavity 12 preferably in the form of a length of single mode optical fiber including a core 14 surrounded by a cladding 16. Core 14 and cladding 16 are preferably fabricated of fused silica to which index of refraction altering dopants are added, as necessary, to achieve the index difference required for waveguiding action. Single mode propagation is assured in the core 14 by selecting the fiber geometry and material parameters in accordance with the well-known relation:

$$2\pi(a/\lambda)(n_1^2-n_2^2)^{\frac{1}{2}} < 2.405 \tag{1}$$

where $a =$ core radius, $\lambda$ is the wavelength, $n_1$ and $n_2$ are the core and cladding indices of refraction, respectively, and 2.405 is a constant whose value is the 0th order Bessel function at the first root.

In configuring the fiber of the resonant optical waveguide 10, it will be understood that it must be structured to propagate single mode for wavelengths corresponding to the communication band to be amplified and, as well, for the wavelengths corresponding to the emission band at which cavity 12 is to lase.

Figure 2:
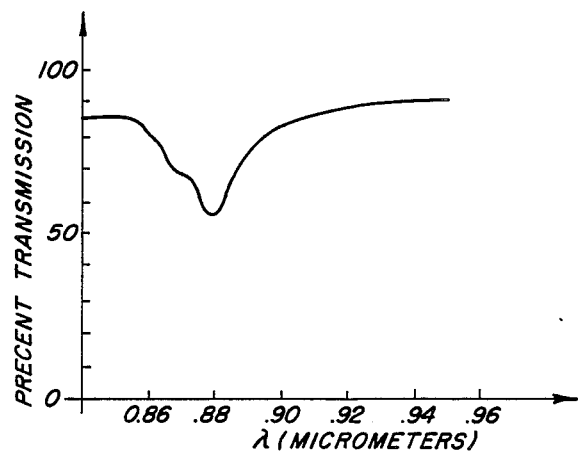
FIG. 2 is a graph showing the absorption spectrum of a gain material suitable for use in the invention.
Figure 3:
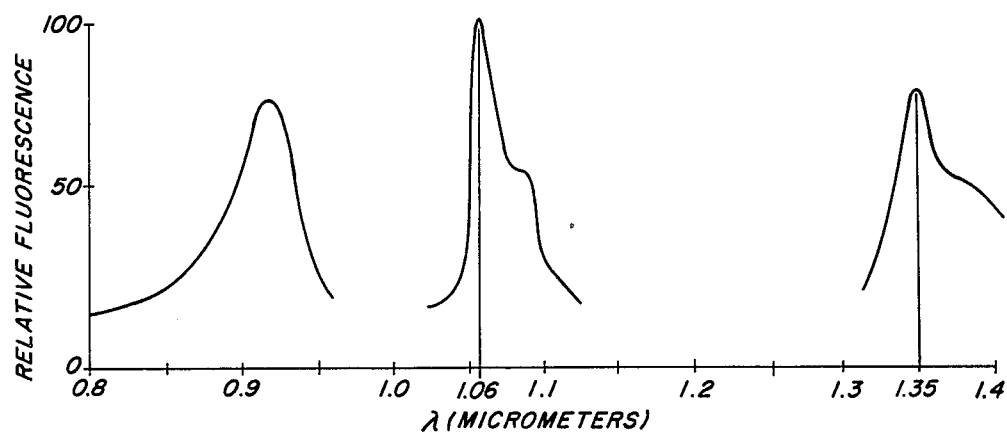
FIG. 3 is a graph showing the emission spectrum of the material of FIG. 2.
Figure 4:
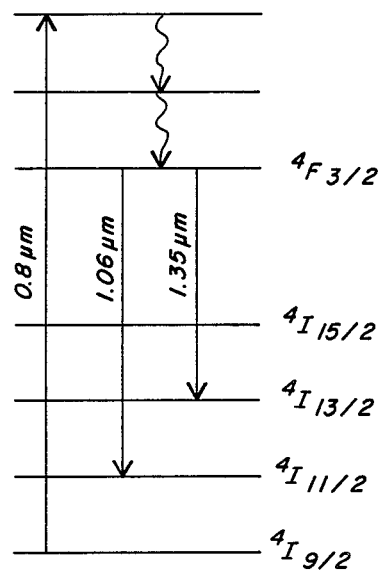
FIG. 4 is a typical energy level diagram for trivalent neodymium in a glass host which gives the emission spectrum shown in FIG. 3.

Core 14 also contains an active gain material, a medium in which stimulated emission of light takes place. The preferred active material is neodymium oxide which has the absorption and fluorescence spectrums shown in FIGS. 2 and 3, respectively.

Although neodymium oxide is preferred, other suitable active gain materials can be used so long as these materials are multilevel material systems having, like neodymium oxide, at least two emission peaks at two different conveniently located emission bands, and in which the upper energy level for the two transitions is the same. Notice that in FIG. 3, neodymium peaks at wavelengths centered at 1.06 and 1.35 micrometers, both regions of extreme interest for optical communications because of the low attenuation characteristics of fibers in these regions. Also, the gains of neodymium oxide at these wavelengths are different, with the gain coefficient $\beta'$ per ion less at 1.35 micrometers by about a factor of four as compared with the gain coefficient $\beta$ at 1.06 micrometers.

Whatever the active gain material, either neodymium oxide or its equivalent, it preferably is present in concentrations within the range from 0.01 to 10.0 weight percent. The considerations of importance in selecting the exact concentration from within this range are the length of the resonant waveguide cavity 12, the pumping arrangement, the level of overall gain to be achieved and the need to have the concentration be not so high as to cause concentration quenching.

Dichroic mirrors 18 and 20 are arranged in each end of the cavity 12 so that it behaves in a well-known manner as a resonant, linear Fabry-Perot type cavity. The effective length of the cavity, call it $L_r$, determines the frequency or wavelengths that it will support and is an integral number of half-wavelengths, i.e., $$L_r = N\lambda/2n_3 \tag{2}$$

where $\lambda$ is the free space wavelength and $n_e$ is the effective index of the core 14 at the resonant mode.

The wavelength separation between resonant modes is determined by changing the value of N by integral values. The separation between adjacent resonant wavelengths is given by the equation:

$$\Delta\lambda = \lambda^2 / 2L_r n_e \tag{3}$$

An inspection of this equation reveals that the spacing between resonant modes varies inversely with the effective length, $L_r$. It is important that the effective cavity length, $L_r$, be such that the cavity supports resonant wavelengths centered on both of the gain material's peak emission bands and that the separation between resonant modes correspond to the separation between communication channels. Otherwise, the overall length of the cavity 12 can vary by one or more orders of magnitude as required.

Once the resonant characteristics of the cavity 12 have been established, that is, it is made to support equally resonant wavelengths centered under the peak emission regions of the gain material and spaced to match the communication channel separation, the characteristics of the dichroic reflectors, 18 and 20, are set to promote steady state lasing action at 1.06 micrometers and to prevent steady state lasing action from occurring at 1.35 micrometers. This can be done by selecting proper values for the reflectivities in relation to the values for the gain coefficients, $\beta$ and $\beta'$.

Figure 5:
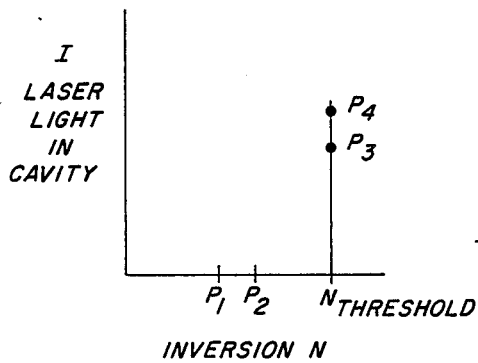
FIG. 5 is a diagrammatic representation of the oscillating laser light in the cavity and the steady state population inversion for pumping below and above laser threshold.

The condition for laser oscillation at 1.06 micrometers is given by the following equation:

$$R_{18}R_{20}e^{-(\alpha - \beta N_{th}^{1.06})2L_r} = 1 \tag{4}$$

where $R_{18}$ and $R_{20}$ are the reflectivities at the ends of the cavity 12 at 1.06 micrometers; $\alpha$ is attenuation by both absorption and scattering per unit length, $\beta$ is the gain coefficient at 1.06 micrometers, $N_{th}^{1.06}$ is the inversion at threshold for laser oscillation at 1.06 micrometers, and $L_r$ is the length as previously given. The value for the inversion is constant at the threshold value for any level of pumping above threshold. This is indicated in FIG. 5 by pump levels 3 and 4. That is, with a change in the value for the pump, when one is above threshold for laser oscillation, the change reflects itself in a change in the light level in the cavity 12 without a corresponding change in threshold. That is, the threshold remains constant or clamped at the threshold value.

This constancy of the inverted population applies to the steady state value. There can be fluctuations in going from one pumping level to another, but for this development here, it is not necessary to take these fluctuations into account. If these fluctuations become substantial, they can be eliminated by feedback control to limit the rate at which pumping fluctuations occur.

A similar equation governs laser oscillation at 1.35 micrometers. This is indicated by the following equation in which there are primes on all of the relevant quantities.

$$R'_{18}R'_{20}e^{-(\alpha' - \beta' N_{th}^{1.35})2L_r} = 1 \tag{5}$$

That is, $R'_{18}$ and $R'_{20}$ are the reflectivities at the ends of cavity 12 at 1.35 micrometers, $\alpha'$ is the attenuation coefficient per unit length at 1.35 micrometers, $\beta'$ is the gain coefficient per ion at 1.35 micrometers, $N_{th}^{1.35}$ is the threshold population and population above laser oscillation at 1.35 micrometers.

For simplicity in the further development of the equations here, R is taken as the geometric means of the reflectivities at both ends of the cavity 12. That is, $$R = \sqrt{R_{18}R_{20}} \tag{6}$$

$$R' = \sqrt{R'_{18}R'_{20}} \tag{7}$$

A further simplification in the equations results from neglecting the values of $\alpha$ and $\alpha'$ relative to one over twice the length, $L_r$, times the logarithms of the products of the end reflectors. That is, $$\alpha << (\tfrac{1}{2}L_r)\ln R^2 \tag{8}$$

$$\alpha' << (\tfrac{1}{2}L_r)\ln R'^2 \tag{9}$$

The conditions for laser oscillations to occur at 1.06 micrometers rather than at 1.35 micrometers is equivalent to the statement that:

$$N_{1.06} < N_{1.35} \tag{10}$$

This condition for laser oscillation at 1.06 micrometers rather than at 1.35 micrometers is equivalent to:

$$\frac{1}{\beta}\ln\frac{1}{R} < \frac{1}{\beta'}\ln\frac{1}{R'} \tag{11}$$

If both the reflectors, R and R' are close to 1, that is:

$$(1-R) << 1 \tag{12}$$

$$(1-R') << 1 \tag{13}$$

then to first order in the quantities, (1-the reflectivities), the condition for laser oscillation at 1.06 micrometers is:

$$(1-R) < (\beta/\beta')(1-R') \tag{14}$$

This is the essential result which will be used for the subsequent example to indicate the operation of the device 10. A more convenient form, however, for equation 14 is given by the following:

$$R > 1 - (\beta/\beta')(1-R') \tag{15}$$

Since $\beta/\beta'$ is approximately equal to four for the example, this equation can also be written as:

$$R > 1 - 4(1-R') \tag{16}$$

For example, if the reflectivity at 1.35 micrometers is equal to 99%, this calls for a reflectivity at 1.06 micrometers in excess of 96%.

Another example is for a reflectivity at 1.35 micrometers of 97%. Here, the reflectivity at 1.06 micrometers must be in excess of 88%.

To summarize then, the cavity 12 can be made to lase at 1.06 micrometers by pumping it until the gain overcomes the losses at this wavelength. From this point on, any further energy put into the system does not result in more inversion, but instead changes the light level in the cavity. Instead, under steady state conditions the inversion remains at the value corresponding to that for threshold. From that point on, whatever additional energy is put in can be extracted in the form of light out. The mirrors are arranged by proper values so that this is assured and when this happens, the inversion is automatically fixed at 1.35 micrometers and is thus available to uniformly amplify any signals introduced into the cavity 12.

To pump the atomic population of the core 14 to its required levels of excitation, energy is supplied by a laser diode 24 which preferably is butt coupled to core 14 via a fiber segment 22 of appropriate optical configuration for maximizing coupling efficiency. The output of the diode 24 is preferably of narrow bandwidth and centered on the peak absorption of the gain material. A gallium aluminum arsenide type would be suitable.

Optical signals within the select communication band of interest presumably have been placed on a trunk such as that designated at 25 in FIG. 1. The trunk 25 is preferably single mode fiber including a core 26 surrounded by a cladding 28 and has an end segment thereof laterally coupled to the cavity 12 to transfer these signals, $\lambda_i$, into the cavity core 14 via the well-known phenomena of evanescent coupling. As will be appreciated, this coupling is achieved by proper choice of coupling length and proximity of the cores 14 and 26 whose separation can be controlled in a variety of ways including adjustment of the thicknesses of the claddings 16 and 28.

After the signals are transferred into the core 14, they undergo multiple passes along it, picking up some gain on each pass until they are laterally coupled out as amplified signals by an arrangement similar to the one used to introduce them into the cavity 12. In this regard, the output is by way of a length of fiber near the end of another optical fiber 28 with core 30 and cladding 32. After transfer to the fiber 29, the signals now, $\lambda_o$, undergo attenuation as they travel to their next destination which may be a similar amplification device.

The means for coupling signals in and out of the cavity 12 need not be segments of long optical fiber lines, but may conveniently be small fiber segments that are at one end laterally coupled to cavity 12 in the manner of FIG. 1 with their free ends in turn, laterally coupled to long lines in similar fashion.

A further benefit of the present invention relates to the avoidance of cross-channel crosstalk when the amplifier is used to amplify two signals simultaneously. This can be understood by comparison with the traveling wave amplifier in which there is a single pass of the light to be amplified at two wavelengths say, $\lambda_1$ and $\lambda_2$, both within the band at which amplification is to occur.

In the traveling wave amplifer, the presence of a signal at $\lambda_1$ can change the extent of population inversion by slightly depleting or saturating the population inversion thereby presenting to the signal at $\lambda_2$ a modified population inversion. This modification is at the frequency corresponding to $\lambda_1$. The net result is there is impressed on $\lambda_2$ a signal at $\lambda_1$. That is, there has been produced cross-channel crosstalk between the two wavelengths, $\lambda_1$ and $\lambda_2$ mediated by the saturation of the population inversion due to the presence of both signals as well as the presence of spontaneous emission.

In the case of the present invention, the presence of $\lambda_1$ in the resonant structure does not change the population inversion, but instead extracts energy at the expense of the lasing band which is the second band of emission at which laser oscillations are occurring. That is, one has the band at which laser oscillation occurs where the population inversion is high enough to give laser action in that band. At the communications band, there can be two wavelengths, $\lambda_1$ and $\lambda_2$. But, there will not be cross-channel crosstalk mediated via a shift in population inversion due to one of them impressing a signal in the other. Instead, what takes place is that the presence of one signal, $\lambda_1$, in the communications band changes the light level in the cavity at the oscillation band rather than changing the population inversion presented at the second wavelength.

Figure 7:
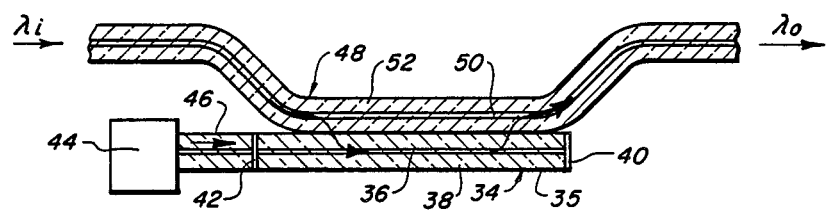
FIG. 7 is a diagrammatic representation showing another embodiment for practicing the invention.

An alternative way of coupling signals in and out of the inventive amplifier is shown in FIG. 7 where the amplifier is designated at 34 and includes an optical resonant fiber cavity 35 with core 36, cladding 38 and dichroic end mirrors 40 and 42. Cavity pumping is by laser diode 44, which is coupled to core 36 by a fiber segment 46. Here, the trunk with core 50 and cladding 52 carrying the communication signals, $\lambda_i$, is laterally coupled without interruption over the appropriate length, and the signals transfer by evanescent coupling to the cavity 34 for amplification after which they recouple to trunk 48 and proceed to their next destination as, $\lambda_o$.

Figure 8:
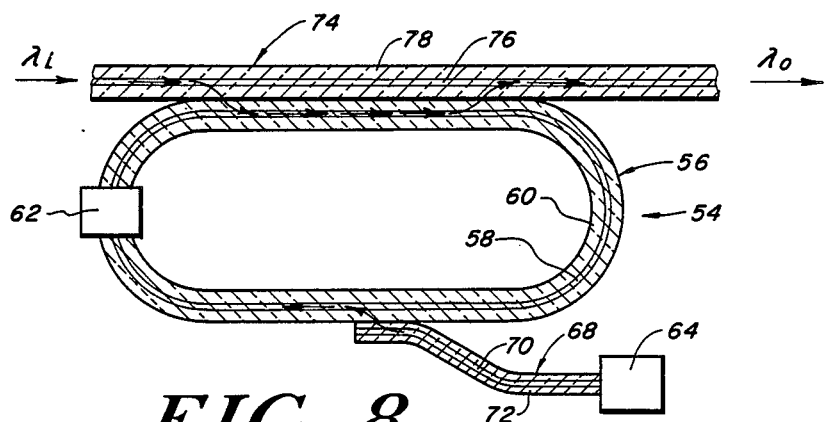
FIG. 8 is a diagrammatic representation of yet another form of the invention.

FIG. 8 illustrates generally at 54 yet another embodiment of the amplifier of the invention. Here, the resonant waveguide cavity is in the form of a closed-loop resonator 56 having a core 58 surrounded by cladding 60. As before, core 58 includes the active gain material. The basic resonant characteristics for the resonant regions of interest are established according to the principles described previously except that here the effective length $L_r$, is related in a well-known way to the closed-loop path length. The role which the mirrors, 18 and 20, played in the linear cavity 12 of FIG. 1 here is taken on by an intercavity element 62 which can be, for example, a dispersive lateral coupling. Functionally, the element 62 operates to set the efficiency with which cavity 56 supports the two resonant wavebands of interest. In this manner, the closed-loop cavity 56 is made to resonate more efficiently at the region of the gain spectrum where lasing action is desired and less efficiently in another region where it is to provide gain to the communication band.

Pump power is supplied to the resonant loop waveguide cavity 56 by a laser diode 64 which is laterally coupled thereto via an optical fiber pigtail 68 butt coupled to diode 64 and consisting of a core 70 surrounded by cladding 72. The lateral coupler must be dispersive so that no light is lost at 1.06 micrometers and 1.35 micrometers.

Signal carrying trunk 74 is an optical fiber transmission line operating single mode and comprising core 76 surrounded by cladding 78. The communication signals, $\lambda_i$, propagate along core 78 and are laterally coupled by evanescent coupling in the usual manner into the core 58 for amplification in the closed-loop resonant cavity 56. After amplification, the communication signals are transferred back to the trunk 74, again by lateral coupling of the evanescent type, where they propagate to their next destination as $\lambda_o$. As before, the closed-loop resonant cavity 56 is in form single mode optical fiber.

Figure 9:
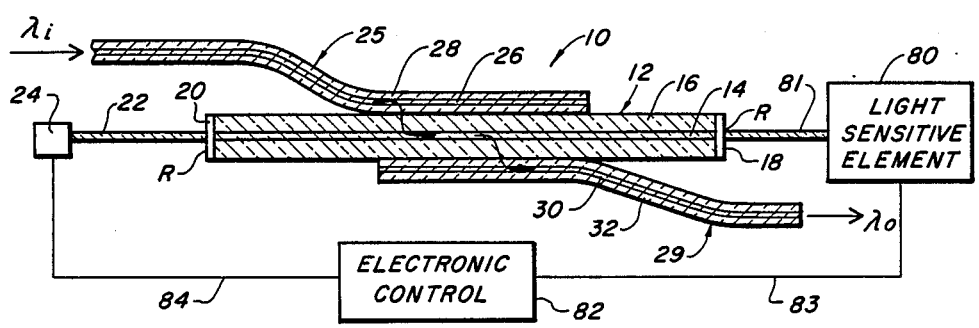
FIG. 9 is a diagrammatic representation of the invention as shown in FIG. 1 along with means for feedback control of its output.
Figure 6:
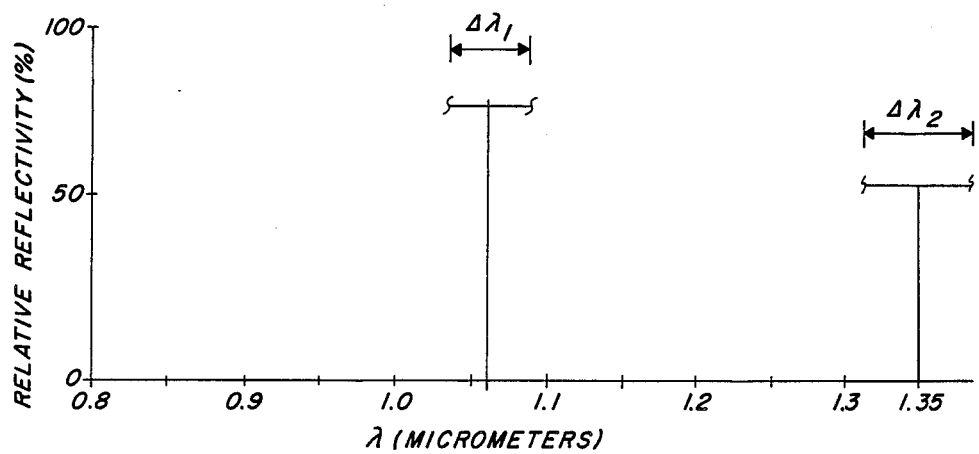
FIG. 6 is a graph showing part of the reflectivity characteristics for dichroic mirrors to be used with the embodiment of the invention shown in FIG. 1.

In FIG. 9, the embodiment of FIG. 1 is illustrated again, but in combination with other components which are used to monitor the lasing output of the cavity 12 and provide a feedback signal to control pumping power to further assure continuous laser action with constant amplification level and minimize transient fluctuations in gain. This is accomplished by coupling a light sensitive device 80 to the resonant waveguide cavity 12 via an optical fiber segment 81. The output of the device 80 is fed to a well-known electronic control 82 via line 83. The output of the electronic control 82 is fed to the laser diode 24 where it is used in a well-known way to control its output and thus pumping power fed to the core 14.

Those skilled in the art may practice the invention in other ways in accordance with its teachings and still be within its scope. For example, proper adjustment of the values for the reflectors 18 and 20 can make the device lase at 1.35 micrometers and amplify at 1.06 micrometers. Therefore, it is intended that all matter contained in the above description or shown in the accompanying drawings shall be interpreted as illustrative and not in a limiting sense.

What is claimed is:

1. A device for amplifying optional signals within a select communication band, said device comprising a resonant optical waveguide cavity having a core containing an active gain material with given absorption and fluorescence spectrums, said active gain material having at least two emission bands which originate from the same upper energy level with one of said emission bands encompassing said select communication band, and said cavity being structured for resonating wavelengths in both said emission bands and for providing a more favorable combination of cavity Q and gain coefficent for resonant wavelengths in said other band than for resonant wavelengths corresponding to said select communication band such that, upon introduction into said cavity of pumping energy within said absorption band and at or above laser thereshold for said other emission band, said cavity lases at wavelengths in said other emission band and thereby retains the atomic population of said emission band corresponding to said select communication band at a value below its lasing threshold for amplifying, independent of the level of pump power introduced into said cavity, signals which are within said select communication band and present in said cavity.

2. The device of claim 1 further including means for introducing pumping energy into said resonant optical waveguide cavity.

3. The device of claim 1 further including means for introducing said optical signals within said select communication band into said resonant optical waveguide cavity.

4. The device of claim 1 further including means for removing amplified optical signals from said resonant optical waveguide cavity.

5. The device of claim 1 wherein said different emission bands of said active gain material have different levels of emission in said different emission bands.

6. The device of claim 1 wherein said resnonant optical waveguide cavity is a linear Fabry-Perot resonant cavity.

7. The device of claim 1 wherein said resonant optical waveguided cavity comprises a closed-loop resonant cavity.

8. A device for amplifying optical signals within a select communication band, said device comprising:

a resonant optical waveguide cavity having a core containing an active gain material with given absorption and fluorescence spectrums, said active gain material having at least two emission bands which orginate from the same upper energy level with one of said bands encompassing said select communication band, and said cavity being structured for resonating wavelengths in both said emission bands and for providing a more favorable combination of cavity Q an gain coefficient for resonant wavelenghts in said other bnad than for resonant wavelengths in said emission band corresponding to said select communication band;

means for introducing said optical signals within said select communication band into said core of said resonant optical waveguide cavity;

means for introducing pumping energy into said core of said resonant waveguide cavity within said absorption band and at or above laser threshold for said other emmission band to cause said cavity to lase at said other emmission band thereby retaining the atomic population of said emmission band corresponding to said select communication band at a value below its lasing threshold to amplify, independent of the level of pump power introduced into said core, optical signals which have been introduced into said resonant optical waveguide cavity and which are within said select commmunication band; and means for removing optical signals from said core of said resonant optical waveguide cavity after they have been amplified therein.

9. The device of claim 8 wherein said resonant optical waveguide cavity comprises a linear Fabry-Perot resonator having on each end thereof a dichroic mirror.

10. The device of claim 8 wherein said active gain material comprises neodymium oxide.

11. The device of claim 10 wherein said device is made to lase at 1.09 micrometers and to amplify at 1.35 micrometers.

12. The device of claim 10 wherein said device is made to lase at 1.35 micrometers and to amplify at 1.06 micromters.

13. The device of claim 8 wherein said resonant optical waveguide cavity comprises a closed-loop resonant cavity.

14. The device of claim 13 further including an element within said closed loop cavity to alter said cavity Q.

15. The device of claim 8 wherein said resonant optical waveguide cavity comprises a length of optical fiber having dichroic mirrors on each end thereof.

16. The device of claim 15 wherein said means for introducing pumping energy into said resonant optical waveguide cavity comprises a laser diode butt coupled to said core.

17. The device of claim 15 wherein said means for introducing optical signals into said core and said means for removing amplified optical signals from said core both comprise optical fiber laterally coupled to said resonant optical waveguide cavity.

18. The device of claim 8 wherein said means for introducing optical signals into said core and said means for removing amplified signals from said core comprises a single optical fiber laterally coupled to said resonant optical waveguide cavity over a given length thereof.

* * * * *